July 23, 1929.  R. J. D'AQUIN  1,721,509
RESILIENT WHEEL
Filed Oct. 1, 1927  2 Sheets-Sheet 1

INVENTOR.
Robert J. D'Aquin
BY Brower + Phelps
ATTORNEYS

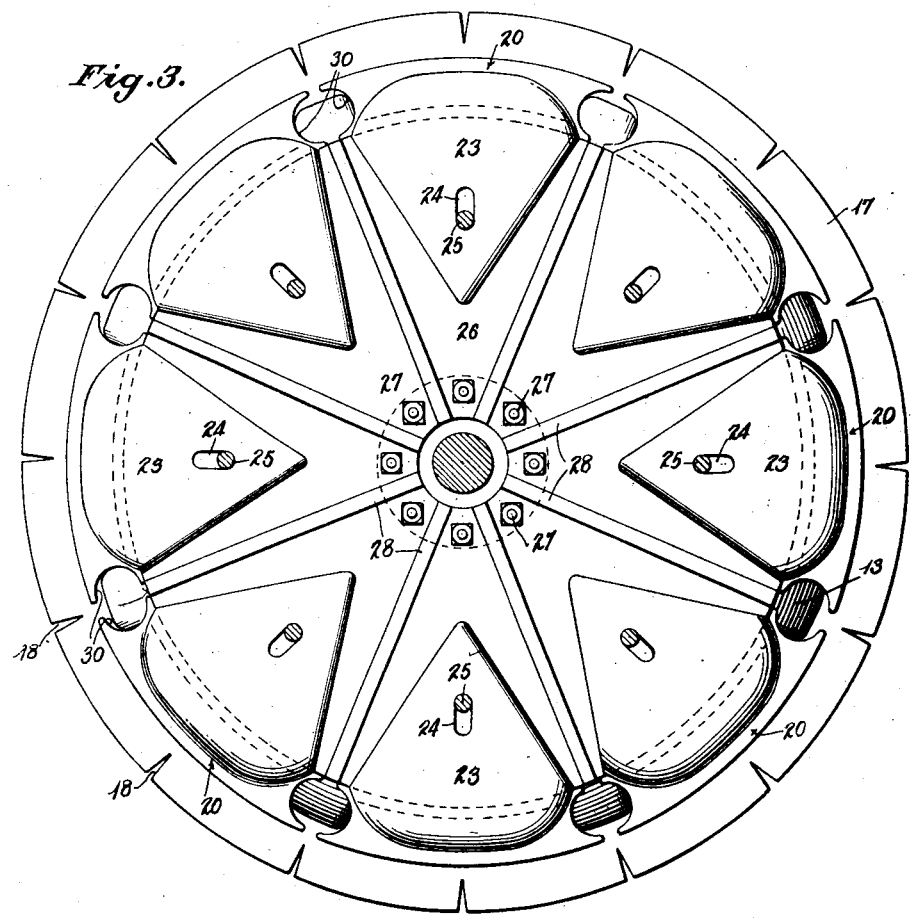
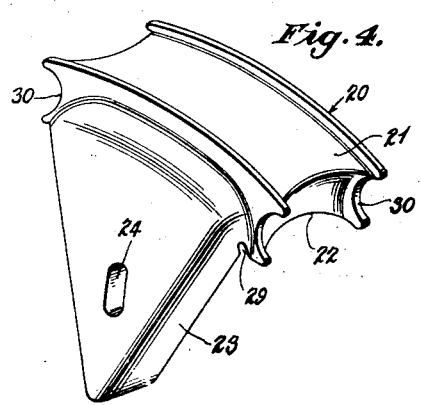
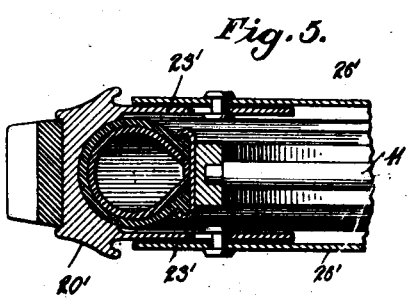

Patented July 23, 1929.

1,721,509

UNITED STATES PATENT OFFICE.

ROBERT J. D'AQUIN, OF NEW ORLEANS, LOUISIANA.

RESILIENT WHEEL.

Application filed October 1, 1927. Serial No. 223,374.

The invention relates to resilient wheels and has as an object the provision of a wheel having pneumatic cushioning means and a wear resistant tread bearing upon said cushion.

It is an object of the invention to provide a resilient wheel having cushioning means formed of a pneumatic tire of a usual form, which tire does not come into contact with the road's surface and which may be readily removed for repair.

It is a further object of the invention to provide a resilient wheel having a pneumatic cushion and provided with means to limit the inward movement of the road-engaging element in case the cushion means becomes deflated.

It is a further object of the invention to provide a resilient wheel having spokes and a pneumatic tire of a usual form provided with a sectional road-engaging rim bearing upon said pneumatic tire and having means to yield a certain distance only under the load of the vehicle.

Further objects of the invention will appear from the following description when read in connection with the accompanying drawings showing illustrative embodiments of the invention and wherein:—

Fig. 3 is an inside elevation with the cover plate omitted;

Fig. 4 is a detail perspective view of one of the cushion engaging elements; and Fig. 5 is a detail sectional view of a modification.

Figure 1:
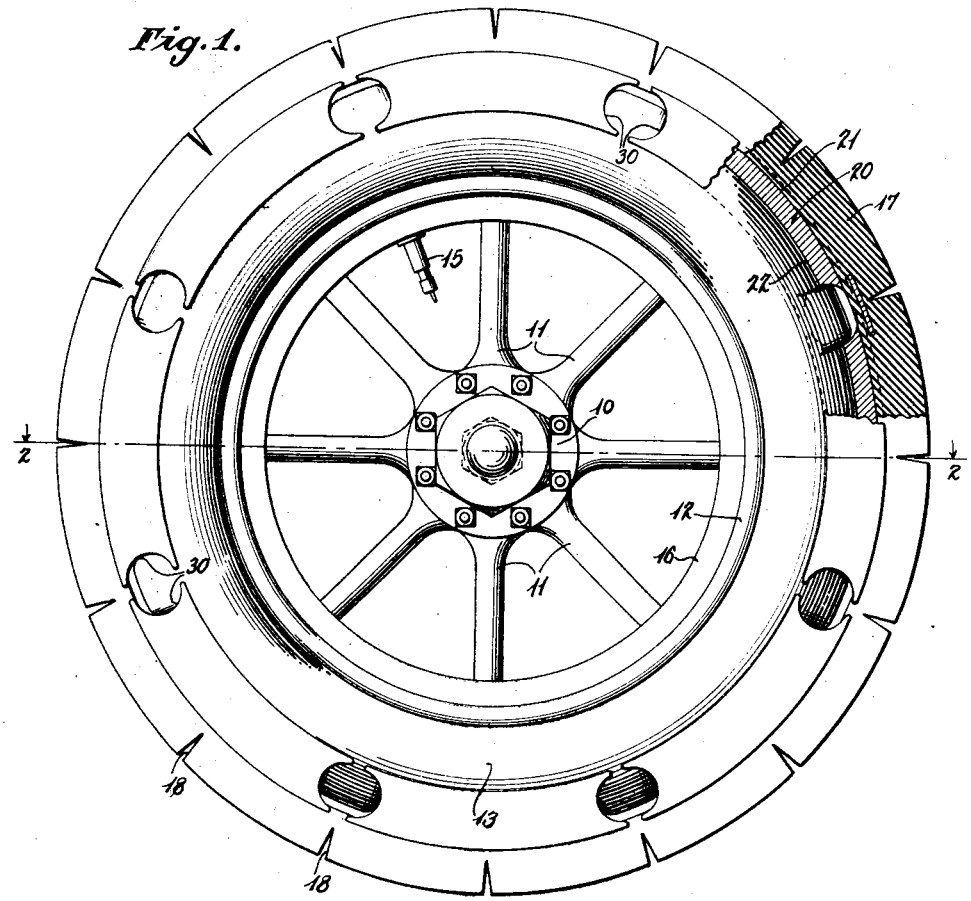
Figure 1 is an outside elevation partly in section.

As shown in Figure 1, the device comprises a hub 10, spokes 11, and a rim 12 shown as formed for engagement with a clincher casing 13 of the usual form housing an inner tube 14. The inner tube 14 may be inflated through the medium of a valve 15 projecting through the rim 12 and the felloe 16 in the usual manner.

To take the wear of the wheel upon the pavement, there is shown an outer tire 17 desirably formed of hard rubber or the like having slits 18 to increase its resiliency and mounted upon a rim 19 formed of sections 20 such as shown in Figure 4.

The sections 20 as shown are formed with arcuate portions 21, each constituting a bearing portion of the rim 19 on its outer surface and formed interiorly with a concave portion 22 adapted to fit against the casing 13. In addition each section 20 is formed with a triangular projection 23 provided with a slot 24 whereby the sections are mounted upon pins 25 carried by a disc 26 secured to the hub 10 by means of bolts 27.

To stiffen the disc 26, there are shown radial flanges 28 extending to its periphery and between which radial flanges the portions 23 of sections 20 project.

By inflation of the cushion member 13, 14, the sections 20 will be forced to the outer limit of travel of slots 24 upon pins 25 and the sections 20 may yield inwardly under the cushioning action of the wheel with consequent sliding of the pins 25 in the slots.

To limit the inward movement of sections 20 in case the inner tube 14 should become deflated, the projections 23 are shown as overhanging a slot 29 and in case of the complete deflation of the cushion, the edge of disc 26 will impinge upon the base of slot 29 to prevent damage to the cushion until the same can be repaired.

The ends of section 20 are desirably formed with recesses 30 to avoid their engagement with each other to prevent their free action.

In the modification of Figure 5, there is shown a disc 26' upon each side of spokes 11 and the sections 20' in this form of the invention are provided with projecting members 23' at each side of the cushioning member.

Figure 2:
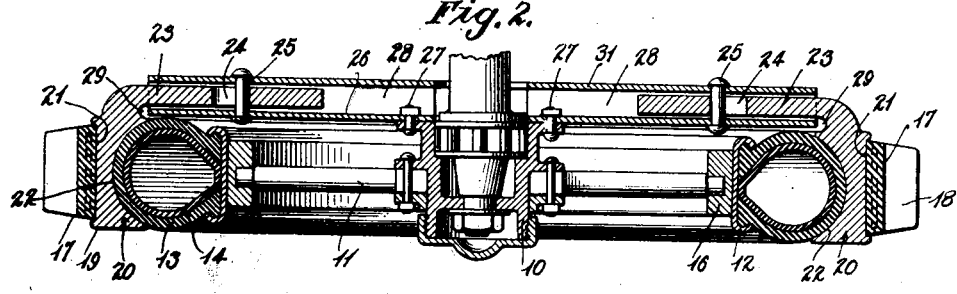
Fig. 2 is a section on line 2—2 of Figure 1.

As shown in Figure 2, a cover plate 31 may be placed over the radial flanges 28 to exclude dirt and to improve the appearance of the wheel.

While the invention is shown as provided with a clincher form of cushioning tire, it is to be understood that a straight side casing and rim may be utilized if desired.

While the cushioning member is described as formed of a pneumatic tube and casing of the usual form, it will be understood that, since no road wear takes place upon its tread, it may be made with thinner walls than usual particularly upon its tread portion, which fact will enable the securing of greater resilience than is secured with the usual tire. The wall need be only thick enough to resist the internal pressure.

Should the cushion become deflated, the wheel may be run as an ordinary solid tired wheel until the cushion can be repaired.

Minor changes may be made in the physical embodiment of the invention within the scope of the appended claims without departing from the spirit thereof.

I claim:

1. A resilient wheel comprising in combination, a hub having spoke means radiating therefrom, a felloe mounted upon said means, a rim mounted upon said felloe, an inflatable pneumatic cushion carried by said rim, a disc mounted upon said hub extending parallel with said means at one side of said cushion, a plurality of cushion-engaging sections having offset inwardly projecting portions, means to slidably mount said projecting portions upon said disc, said sections and portions providing a series of slots for reception of the edge of said disc, said disc adapted to engage the base of said slots to limit inward movement of said sections upon deflation of said cushion, each section provided with a tire-carrying rim portion and a road-engaging tire mounted upon the rim made up of said rim portions.

2. A resilient wheel comprising, in combination, a hub, a pneumatic casing carrying rim supported therefrom concentric therewith, an inflatable pneumatic cushion mounted on said rim, a plurality of rim sections bearing on said cushion, a resilient road engaging tire mounted on said sections, each of said sections formed with a triangular offset portion integral at its base with the section and extending toward said hub, a disc mounted on the hub and overlapping with said portions and a slidable connection between said portions and disc having means to limit the sliding movement.

3. A resilient wheel comprising, in combination, a hub, a pneumatic casing carrying rim supported therefrom concentric therewith, an inflatable pneumatic cushion mounted on said rim, a plurality of rim sections bearing on said cushion, a resilient road engaging tire mounted on said sections, each of said sections formed with triangular offset portions integral at their bases with the section and extending toward said hub on each side of said rim, a pair of discs mounted one on each end of the hub and overlapping with said portions, and a slidable connection between said portions and discs having means to limit the sliding movement.

ROBERT J. D'AQUIN.